United States Patent [19]
Parker

[11] 3,955,420
[45] May 11, 1976

[54] COMPACT TUBULAR TEMPERATURE MEASURING DEVICE

[75] Inventor: Robert Parker, Danville, Calif.

[73] Assignee: RPR, Inc., Dublin, Calif.

[22] Filed: Aug. 12, 1974

[21] Appl. No.: 496,416

Related U.S. Application Data

[63] Continuation-in-part of Ser. No. 475,548, June 3, 1974, abandoned.

[52] U.S. Cl. .............................. 73/356; 23/230 LC; 73/362.8; 116/114 Y
[51] Int. Cl.² ..................................... G01K 11/12
[58] Field of Search .......... 73/356, 371, 419, 362.8, 73/339, 374; 116/114.5, 114 V; 338/28, 22 R; 23/230 LC

[56] References Cited
UNITED STATES PATENTS

| | | | |
|---|---|---|---|
| 2,189,123 | 2/1940 | Barker | 73/374 X |
| 2,712,237 | 7/1955 | Margolis | 73/371 |
| 2,979,650 | 4/1961 | Godshalk et al. | 338/28 X |
| 3,005,171 | 10/1961 | Beckman | 338/28 |
| 3,131,562 | 5/1964 | Anderson et al. | 338/28 X |
| 3,153,343 | 10/1964 | Barnes | 73/362.8 X |
| 3,397,333 | 8/1968 | Jastram et al. | 338/28 X |
| 3,524,726 | 8/1970 | De Koster | 73/356 X |
| 3,651,695 | 3/1972 | Brown | 116/114 V |
| 3,789,669 | 2/1974 | Passman | 73/419 |
| 3,827,301 | 8/1974 | Parker | 73/356 |
| 3,833,145 | 9/1974 | Crosbey et al. | 73/362 |
| 3,859,856 | 1/1975 | Keele et al. | 73/358 |

*Primary Examiner*—Richard C. Queisser
*Assistant Examiner*—Daniel M. Yasich
*Attorney, Agent, or Firm*—Townsend and Townsend

[57] ABSTRACT

A rapid and convenient temperature indicator is provided having a tubular heat-conducting member joined at one end to a heat sink and having the other end rounded for ease of contact with the surface whose temperature is to be measured. Conveniently, a cylindrical protective cover is provided which is slidably mounted on the heat sink by means of a slot relieved threaded member and nut. The heat-conducting tube has a darkened surface which is coated with a liquid crystal composition having a mesophase temperature range which provides a temperature response in the range of interest. One or more liquid crystal compositions may be employed providing bands along the tube. A reticule is provided, which can be calibrated to give an accurate approximation of the temperature of the surface being measured.

13 Claims, 6 Drawing Figures

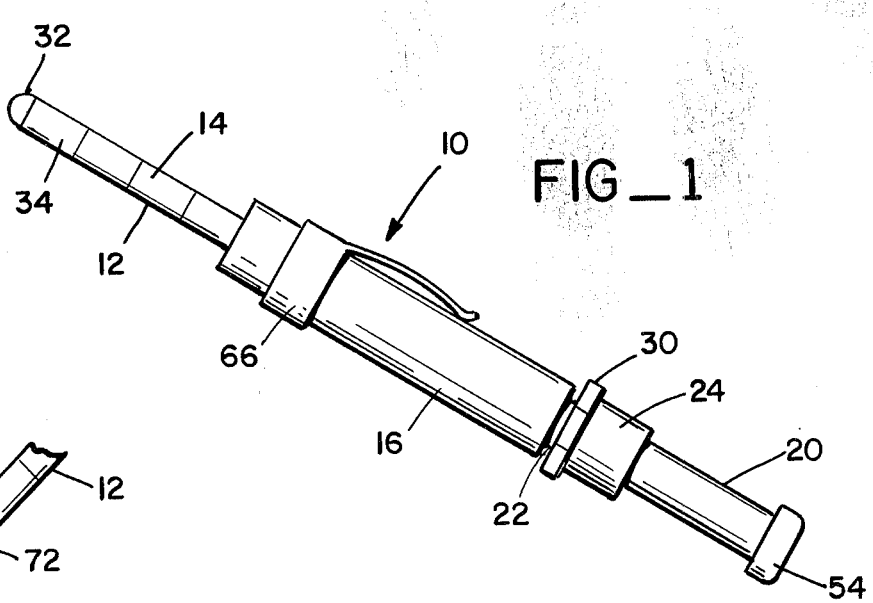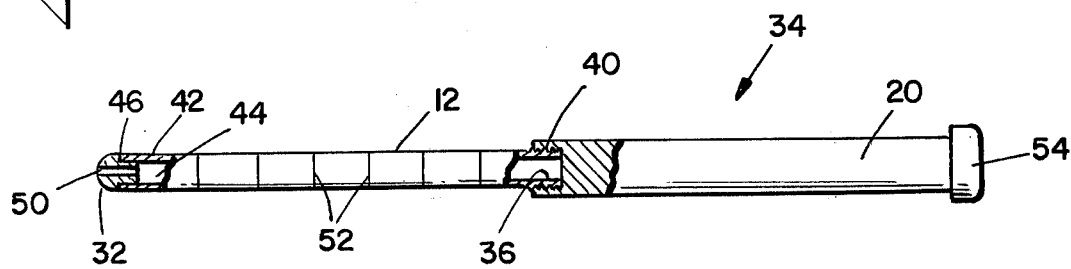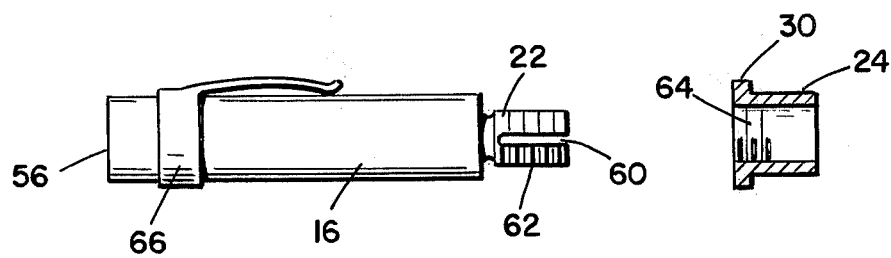

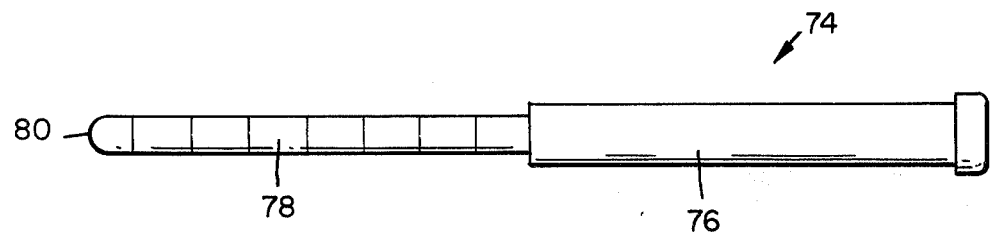
FIG_6

COMPACT TUBULAR TEMPERATURE MEASURING DEVICE

CROSS-REFERENCE TO RELATED APPLICATIONS

This application is a continuation-in-part of Application Ser. No. 475,548, filed June 3, 1974 now abandoned.

BACKGROUND OF THE INVENTION

1. Field of the Invention

In many situations where hot surfaces, either liquids or solids, are involved, it is desirable to have a convenient and economical way to quickly measure the temperature of the surface. For example, during welding, it is important to a proper weld that the substrate being welded is not overheated. Where processing equipment is involved, and hot fluids are being transferred, it is desirable to have some indication of the temperature of the fluid, by measuring the temperature of the conduit. Other situations recommend themselves, whereby a rapid and reasonably accurate device for measuring temperature is desirable.

A device which is useful should be compact, sturdy and provide a rapid response for the measurement. The temperature measurement should be easily obtained, without requiring precise orientation of the measuring device. In addition, the device should be reliable, and the temperature indicator easily observable.

2. Description of the Prior Art

British Pat. No. 1,138,590 discloses the preparation of microencapsulated liquid crystals and a visual display device employing such crystals for temperature determination. U.S. Pat. No. 3,704,625 describes a thermometer employing liquid crystal compositions. U.S. Pat. No. 3,440,882 describes a different type of thermometer.

SUMMARY OF THE INVENTION

A rapid, compact and efficient temperature indicator for high temperature substrates is provided, when the ambient temperature is substantially below the substrate temperature. The indicator has a thin-walled heat-conductive tubular member with a rounded tip at one end and joined to a heat sink at the other end. Depending on the temperature to be measured, the rounded tip may be ceramic. A tubular guard is provided which is slidably mounted on the heat sink. The heat-conductive tube is coated over a dark background with a liquid crystal composition which responds to an increase in temperature by a colored band moving along the tube, the distance of the band from the end of the tube being related to the temperature of the substrate.

BRIEF DESCRIPTION OF THE DRAWINGS

FIG. 1 is a perspective view of the temperature indicator of this invention;

FIG. 2 is a perspective view partially broken away in cross-section of the heat-conductive member of the temperature indicator;

FIG. 3 is a perspective view of the guard employed with the temperature indicator;

FIG. 4 is a cross section in elevation of an internally threaded sleeve employed with the guard;

FIG. 5 is a diagrammatic view of the temperature indicator against a heated surface; and FIG. 6 is a perspective view partially broken away in cross section of an alternate heat-conductive member of the temperature indicator.

DESCRIPTION OF THE SPECIFIC EMBODIMENTS

A compact and convenient temperature indicator for high temperature surfaces is provided having a thin-walled heat-conductive member coated with at least one liquid crystal composition over a dark surface. The temperatures of interest are substantially above temperatures at which the liquid crystals are stable, and above the ambient temperature. At one end, a rounded tip is provided, which depending on the temperature range of interest may be insulative, while at the other end, the tubular member is affixed in heat-conducting relationship to a heat sink. A thin coating of cholesteric liquid crystals is applied to the outside of the tubular member over a dark background. The liquid crystals may be further coated with a transparent protective coating. For convenience, a reticule can be formed along the tubular member to indicate the temperature.

An additional convenience and protection for the liquid crystals is a tubular guard which is slidably mounted on the heat sink. The guard can serve a plurality of purposes in serving as a base for a pocket clasp, as well as designating a particular position along the heat-conductive tube, which indicates the temperature of interest. Furthermore, the guard serves as a place to hold the temperature indicator, without concern as to the temperature the heat sink achieves.

The temperature indicator is a thin-walled tube of any convenient heat-conducting material. Conveniently, the temperature indicator is made of a metal, such as aluminum or copper. The thin wall will generally be of at least 5 mils in thickness to provide the necessary strength and not more than about 20 mils, preferably being from about 10 to 15 mils. The diagonal or diameter to the outer surface (O.D.) is conveniently at least about 3/32 of an inch, and generally not more than about ⅜ inch, more usually about ¼ inch. While the temperature indicator tube can have any type of cross-section, such as square, rectangular, hexagonal, or the like, it is conveniently circular. The tube is blackened on the outside by any convenient means which will permit the coating of liquid crystals onto the dark surface. The tube may be darkened by electrolytic means, by black ink, or the like. The dark coating, if applied, will generally be from about 1 to 3 mils in thickness.

Coated onto the tube will be at least one liquid crystal film, derived from a slurry or ink, of from about 2 to 10 mils in thickness, preferably from about 3 to 8 mils in thickness. Normally, the tube will be coated with only one liquid crystal composition, although two or more liquid crystal compositions could be employed with advantage. For example, one could have stripes of different liquid crystal compositions which have substantially different temperature ranges for their mesophase, so that a much wider range of temperature could be determined. Alternatively, one could have consecutive areas of different liquid crystal compositions to expand the range of temperatures which could be detected. A third variation is to have two or more coat superimposed, one over the other, with different meso phase ranges, particularly where the two composition have a substantial overlap. There would then be tw visible colored areas in the overlapping temperature range, when measuring the temperature. However, in most cases, for simplicity and convenience, a single liquid crystal composition will suffice.

Various liquid crystal compositions can be employed. For example, microencapsulated liquid crystal compositions can be employed, such as those disclosed in British Pat. No. 1,138,590. Alternatively, other liquid crystal compositions can be employed such as those disclosed in U.S. Pat. No. 3,441,513. A liquid crystal ink which can be used to advantage is found in copending Application Ser. No. 425,006, filed Dec. 17, 1973. The liquid crystal compositions will normally have temperature ranges in the range of 40° to 200°F, usually 45° to 175°F. The temperature range for a particular liquid crystal composition may range from about 2° to 60°F, usually 2° to 20°F.

The particular choice of liquid crystal composition, e.g. unencapsulated, or in combination with a polymeric binder, is not critical to this invention. Depending upon the particular composition, the liquid crystal composition may be sprayed, rolled, brushed, or otherwise affixed to the tubular temperature indicator. Preferably, the liquid crystal composition is then coated with a thin, transparent coating of a protective polymeric film, such as an acrylic film, polyvinyl chloride film, or the like. The choice of the polymer is dependent upon its temperature stability, the polymer having at least the same temperature stability as the liquid crystal composition. The coating also provides some insulation of the liquid crystal composition from the environment. Usually, the protective coating will be at least 3 mils and generally not more than about 10 mils in thickness.

Depending on the temperature of interest, the tube may be mechanically rounded, a rounded heat transfer button introduced into the end of the tube or a temperature attenuator tip provided, which is conveniently a ceramic tip connected to a ceramic rod extending into the tubular temperature member. An opening in the tip facilitates the introduction of the tip into the tube.

The heat attenuator is conveniently mushroom-shaped with a rounded head and trunk with a passage therethrough. The tip is round to permit accurate temperature determination, irrespective of the particular angle at which the temperature indicator touches the substrate. The tip is fitted into the tubular member, so as to provide satisfactory heat transfer from the tip to the tubular member. The attenuator member may be of any size which provides the desired degree of attenuation and heat conduction, but is preferably a hemisphere having a diameter approximately equal to the outer diameter of the tubular member, connected to or formed with a rod extending 1/16 to ¼ inch into the tubular member. The opening in the tip may conveniently be from about 1 to 2 mm.

The tubular member will generally be from about 2 to 6 inch long, but can be longer or shorter, depending on the temperature range of interest, the desired degree of accuracy, and the like. To further aid in the determination of the temperature, a reticule can be provided, with a plurality of lines drawn transverse to the axis of the tubular member, either linearly or graduated in accordance with standards.

The end of the tubular temperature indicator opposite the heat transfer tip is affixed either rigidly or detachably to a heat sink member. Conveniently, the tubular temperature indicator can be threaded and screwed into a threaded recess in the heat sink, so that tubular members might be exchanged having different liquid crystal compositions, different lengths, tubes, or the like, so as to permit the determination of different temperature ranges. The heat sink is conveniently a solid heat-conducting material, having sufficient heat capacity to receive the heat from the tubular temperature indicator, so as to in effect, cool the temperature indicator. By acting as a storage for heat, the heat sink can serve to maintain the temperature of the tubular indicator at an elevated temperature, without requiring the tubular member to be at a temperature level which might result in the destruction of the liquid crystal compositions.

Conveniently, the heat sink will be of from about 2 to 6 inches, more usually from about 3 to 5 inches in length, cylindrical, and of the same or somewhat greater outer diameter than the tubular temperature indicator, generally being from about 3/16 to ⅝ inch in outer diameter. The heat sink is conveniently a solid rod of a heat-conductive metal, such as aluminum, although iron, copper, or the like, could be employed.

Slidably mounted on the heat sink is a tubular guard which serves a plurality of functions. The tubular guard is of somewhat greater diameter than the heat sink, usually having an inner diameter of about 1/16 to about 3/16 inch greater than the outer diameter of the heat sink. The guard allows the temperature indicator to be held without any fear of burning of the skin. In addition, the guard can be used as a fixed marker indicating the point which the color band of the liquid crystals must reach for the desired temperature. The guard also acts as a support for a pocket clasp. Finally, the guard can be used to cover a major portion of the temperature indicator member, so as to provide additional protection for the liquid crystals from abrasion or other mechanical attrition during use or storage.

The tubular guard is conveniently mounted on the heat sink by means of a slotted sleeve which is externally threaded and an internally threaded sleeve or nut which serves to lock the slotted sleeve onto the heat sink. The sleeve is situated on the guard at the end distant from the temperature indicator. The sleeve is preferably of a heat insulative plastic. Finally, a cap is provided at the end of the heat sink for appearance and covering the rough edges, if any, of the heat sink, as well as to prevent the guard from slipping off.

The operation of the temperature indicator is dependent upon the known properties of cholesteric liquid crystals to go from a transparent phase to a colored visible mesophase in a predetermined temperature range, based on the particular composition of the liquid crystals. Thus, when the heat transfer tip is heated, the thin-walled tubular member will, in turn, become heated, warming the liquid crystals.

As the temperature of the tubular member passes through the temperature range of the mesophase, the liquid crystals will become visible, forming a colored band going from red to blue. Because of the nature of the thin-walled tubular member, a temperature gradient will be rapidly formed across the tubular member, between the heat transfer tip and the heat sink. The hotter the heat transfer tip, the farther the colored band will appear from the heat transfer tip. The temperature indicator can be calibrated, so that the distance from the attenuator tip at which the colored band appears, will indicate its specific temperature. In operation, a band of color will appear adjacent the heat transfer tip and then move along the thin-walled tubular member toward the heat sink until equilibrium is established.

The choice of liquid crystal composition is determined by the temperatures of interest, the degree of attenuation achieved with the heat transfer tip, and the heat conductance of the tube. The tube temperature gradient can be calibrated and a liquid crystal composition chosen accordingly.

For further understanding of the subject invention, the drawings will now be considered.

In FIG. 1, a temperature indicator 10 is shown having a thin-walled temperature indicator tube 12 coated with liquid crystals 14, extending from a tubular guard 16. The tubular guard 16 is slidably mounted on heat sink rod 20 by means of slotted sleeve 22, only a portion of which can be seen, and locknut or internally threaded sleeve 24. The locknut 24 can be knurled or have a hexagonal band 30 to aid in gripping and locking the nut. At the temperature measuring end of the temperature indicator tube 12 is a mushroom-shaped ceramic attenuator tip 32, which has a rounded surface extending from the tube and a rod which fits into the indicator tube 12. The rounded portion has a circumference adjacent to the tubular member conforming with the circumference of the indicator tube 12.

In FIG. 2, the temperature indicating member 34 is depicted which has the heat sink rod 20 and the temperature indicator tube 12 detachably joined. The temperature indicator tube 12 has a threaded end 36 which is threaded into chamber 40. The thin wall 42 of the temperature indicator tube 12 encloses chamber 44. The thin wall 42 abuts shoulder 46 of attenuator tip 32. The attenuator tip 32 has channel 50 which allows for the exiting and entry of gases from one end of the tube chamber 44. A plurality of scored lines 52 are provided, which provide a graduation for convenient temperature determination. A cap 54 at one end of the heat sink rod 20 serves as a stop and covers any rough edges of the rod 20.

In FIGS. 3 and 4, the tubular guard member 16 and locknut 24 are depicted. The guard cylinder 16 is open at end 56 and at the opposite end is affixed to threaded plastic sleeve or male member 22. The sleeve has a plurality of slots 60, which extend substantially the length of the sleeve and allow for expansion of the sleeve. The sleeve is threaded with threads 62. Locknut 24 has hexagonal shoulder 30 and threaded portion 64 which mates with the threaded portion 62 of the sleeve or male member 22. Tightening of the nut onto the male member 22 locks the guard in position along the heat sink rod 20. For convenience, a pocket clasp 66 is mounted on the cylindrical guard 16, so that the temperature indicator 10 can be easily stored and carried.

In FIG. 5, a portion of the temperature indicator tube 12 is indicated, placed at an angle with the attenuator tip 32 touching a hot surface 70. A colored band 72 appears a short distance from the surface. The distance from the surface of the colored band indicates the temperature of the surface 70.

In FIG. 6, a heat-conductive member is indicated without a heat attenuator tip. This member may be used for measuring elevated temperatures in the range of about 150° to 400°F or higher. In this heat-conductive member 74, as that depicted in FIG. 2, there is a heat sink 76 connected in heat transfer relationship with an indicator tube 78, which has a rounded closed tip 80 of the same or different heat-conducting metal as the indicator tube 78. The rounded tip 80 allows for heat measurement at various angles and for heat transfer to the indicator tube 78.

In a particular embodiment, a 0.25 inch O.D., 7/32 inch I.D., 3⅜ inch long aluminum tube was coated successively with flat black paint, liquid crystal composition and polyurethane clear gloss. The aluminum tube was affixed to a solid aluminum rod 4⅛ inch long and ¼ inch in diameter. A 3/32 inch diamter ceramic tip was introduced into the open end of the aluminum tube. With a liquid crystal composition employed having a mesophase range of about 122° to 131°F, a temperature range from 200° to about b 500°F was readily determinable at 20° to 40°F increments.

The subject invention provides a compact, rapid and convenient way for measuring high temperatures, such as occur during welding, soldering, with processing equipment and the like. The apparatus is sturdy, accurate, and can be used for long periods of time with good reproducibility. By use of the temperature indicator, the substrate temperature can be rapidly determined, to aid in preventing overheating of surfaces, or determining when a surface or piece of equipment is ready for use.

Although the foregoing invention has been described in some detail by way of illustration and example for purposes of clarity of understanding, it will be obvious that certain changes and modifications may be practiced within the scope of the appended claims.

What is claimed is:

1. A portable apparatus for rapid measurement of and elevated temperature surface which comprises:
   a graduated heat-conducting thin-walled tubular member defining an inner chamber and having a dark outer surface coated with at least one liquid crystal composition for indicating temperatures by a color changed in a selected temperature range;
   at one end of said tubular member, a rounded heat transfer tip in heat-conducting relationship with said tubular member; and
   at the other end of said tubular member, a heat sink member operably connected to said tubular member in heat-receiving relationship with said tubular member.

2. An apparatus according to claim 1, wherein said heat sink member is rod-shaped and including;
   a tubular guard member slidably mounted on said heat sink member.

3. An apparatus according to claim 2,
   including a pocket clasp mounted on said tubular guard member.

4. An apparatus according to claim 1, wherein said rounded heat transfer tip is a heat attenuator.

5. An apparatus according to claim 4, wherein said heat attenuator comprises a rounded head abutting said one end of said tubular member; and said heat attenuator including a rod extending from said round head into said tubular member.

6. An apparatus according to claim 1, wherein said heat transfer tip is metallic.

7. An apparatus according to claim 1, wherein said tubular member is coated with at least two coatings containing different liquid crystal compositions, the coatings extending a substantial portion of the distance from the one end to the other end of said tubular member.

8. An apparatus according to claim 7, wherein said coatings are superimposed.

9. An apparatus according to claim 1, wherein said tubular member is detachably connected to said heat sink member.

10. A portable apparatus for rapid measurement of and elevated temperature surface which comprises:
- a graduated heat-conducting thin-walled cylindrical tubular member defining an inner chamber and having a dark outer surface coated with at least one liquid crystal composition operably connected to said tubular member extending substantially the entire length of said tubular member;
- at one end of said tubular member, a rounded heat transfer tip in heat-conducting relationship with said tubular member;
- at the other end of said tubular member, a cylindrical rod-shaped heat sink operably connected in heat-conducting relationship with said tubular member; and
- a tubular guard member slidably mounted on said heat sink member.

11. An apparatus according to claim 10, having at least two superimposed coatings of different liquid crystal compositions.

12. An apparatus according to claim 10, including a pocket clasp mounted on said tubular guard member.

13. A portable apparatus for measurement of and elevated temperature surface which comprises;
- a graduated heat-conducting thin-walled cylindrical tubular member defining an inner chamber and having a dark outer surface coated with at least one liquid crystal composition for indicating temperatures by a color changed in a selected temperature range extending substantially the entire length of said tubular member;
- at one end of said tubular member, a rounded heat transfer ceramic tip having a rounded edge and a trunk extending into said tubular member in heat-conducting relationship with said tubular member;
- at the other end of said tubular member, a cylindrical rod-shaped heat sink connected in heat-conducting relationship with said tubular member; and
- a hollow tubular guard member slidably mounted on said heat sink member.

* * * * *